(12) United States Patent
Urso et al.

(10) Patent No.: US 7,025,565 B2
(45) Date of Patent: Apr. 11, 2006

(54) GAS TURBINE ENGINE COMPONENT HAVING BYPASS CIRCUIT

(75) Inventors: Andre Christopher Urso, Fairfield, OH (US); George Albert Durgin, Punta Gorda, FL (US); Christopher George Housley, Hamilton, OH (US); George E. Moore, Lebanon, OH (US); Harris Daniel Abramson, Cincinnati, OH (US); Robert Paul Czachor, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 245 days.

(21) Appl. No.: 10/757,188

(22) Filed: Jan. 14, 2004

(65) Prior Publication Data

US 2005/0150234 A1   Jul. 14, 2005

(51) Int. Cl.
  *F02C 7/28* (2006.01)
(52) U.S. Cl. .................. 415/173.5; 60/796; 277/418
(58) Field of Classification Search .............. 60/751, 60/752, 796; 415/115, 116, 173.5; 277/418, 277/424
See application file for complete search history.

(56) References Cited

U.S. PATENT DOCUMENTS

| | | | | |
|---|---|---|---|---|
| 2,648,520 A | * | 8/1953 | Schmitt | 415/115 |
| 4,157,232 A | * | 6/1979 | Bobo et al. | 415/116 |
| 5,984,630 A | | 11/1999 | Di Salle et al. | |
| 6,050,079 A | | 4/2000 | Durgin et al. | |
| 6,471,216 B1 | | 10/2002 | Brainch et al. | |

* cited by examiner

*Primary Examiner*—Louis J. Casaregola
(74) *Attorney, Agent, or Firm*—Adams Evans P.A.; William Scott Andes

(57) ABSTRACT

A gas turbine engine component has an annular flange arm, a backing plate mounted to the flange arm and a bypass circuit formed between the flange arm and the backing plate. The bypass circuit includes one or more channels formed in one of the flange arm or the backing plate. When more than one channels are used, at least one connecting slot is provided between the channels. At least one inlet passage extends through the flange arm in fluid communication with the forward-most channel, and at least one outlet slot is formed between the flange arm and the backing plate in fluid communication with the aft-most channel.

15 Claims, 6 Drawing Sheets

GAS TURBINE ENGINE COMPONENT HAVING BYPASS CIRCUIT

BACKGROUND OF THE INVENTION

This invention relates generally to gas turbine engines and more particularly to seal bypass circuits in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. Aircraft engines ordinarily include a stationary turbine nozzle disposed at the outlet of the combustor for channeling combustion gases into the first stage turbine rotor disposed downstream thereof. The turbine nozzle directs the combustion gases in such a manner that the turbine blades can do work.

Because they are exposed to intense heat generated by the combustion process, certain components, such as combustor liners and turbine rotor blades and nozzles, are cooled to meet life expectancy requirements. This cooling is commonly accomplished with relatively cool air that is diverted from the compressor discharge. Typically, a forward outer seal is provided between the stationary turbine nozzle and the first stage turbine rotor for sealing the compressor discharge air that is bled off for cooling purposes from the hot gases in the turbine flow path. Conventional forward outer seals comprise a rotating labyrinth seal made up of a rotating member and a static member that are generally situated circumferentially about the longitudinal centerline axis of the engine. The static member includes an annular flange to which a stator element is mounted. The stator element is normally made of a honeycomb material. The rotating member has a number of thin, tooth-like projections extending radially toward the stator element. The outer circumference of each projection rotates within a small tolerance of the stator element, thereby effecting sealing between the cooling air and the hot gases in the turbine flow path.

During engine operation, certain engine structure does not heat up as fast as other structure because of differences in mass and the degree of exposure to the hot gases. This effect results in radial thermal gradients in many engine components, such as the static member in which the annular flange does not heat up as fast as other portions of the member. Thermal gradients in the static member can cause high thermal stresses and improper seal clearance between the stator element and the rotating tooth-like projections. To reduce the thermal gradient of the flange, it is known to provide a flange bypass circuit through which some of the compressor discharge air bled off for cooling purposes passes. Although this air is cooler than the hot gas flow, it is warm enough to provide faster heating of the flange. The faster heating results in a smaller thermal gradient. Conventional bypass circuits utilize a series of discrete circuits spaced along the circumference of the flange and the stator element's backing plate. This discrete circuit arrangement provides non-uniform heating of the flange, requires elaborate machining, and uses small fillet radii that create stress concentrations.

Accordingly, there is a need for a bypass circuit that would provide more uniform heating of the flange and allow simpler machining.

SUMMARY OF THE INVENTION

The above-mentioned need is met by the present invention, which, in one embodiment, provides a gas turbine engine component having a bypass circuit formed in the inner surface of an annular flange arm. The bypass circuit includes a channel formed in the radially inner surface. At least one inlet passage extends radially through the flange arm in fluid communication with the channel, and at least one outlet slot is formed in the radially inner surface in fluid communication with the channel.

In another embodiment, the present invention provides a gas turbine engine component including an annular flange arm having a radially inner surface and an annular backing plate mounted to the radially inner surface, the backing plate having a radially outer surface. A bypass circuit includes a channel formed in the radially outer surface of the backing plate. At least one inlet passage extends radially through the flange arm in fluid communication with the channel, and at least one outlet slot is formed in the radially outer surface in fluid communication with the channel.

In yet another embodiment, the gas turbine engine component includes an annular flange arm having a radially inner surface, a radially outer surface, a forward end and an aft end defining an aft edge. First and second channels are formed in the radially inner surface, with the second channel being spaced axially from the first channel. A plurality of connecting slots is formed in the radially inner surface; each one of the connecting slots extends axially between the first and second channels. A plurality of inlet passages extends radially through the flange from the radially outer surface to the first channel. A plurality of outlet slots is formed in the radially inner surface, with each outlet slot extending axially from the second channel to the aft edge.

The present invention and its advantages over the prior art will be more readily understood upon reading the following detailed description and the appended claims with reference to the accompanying drawings.

DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
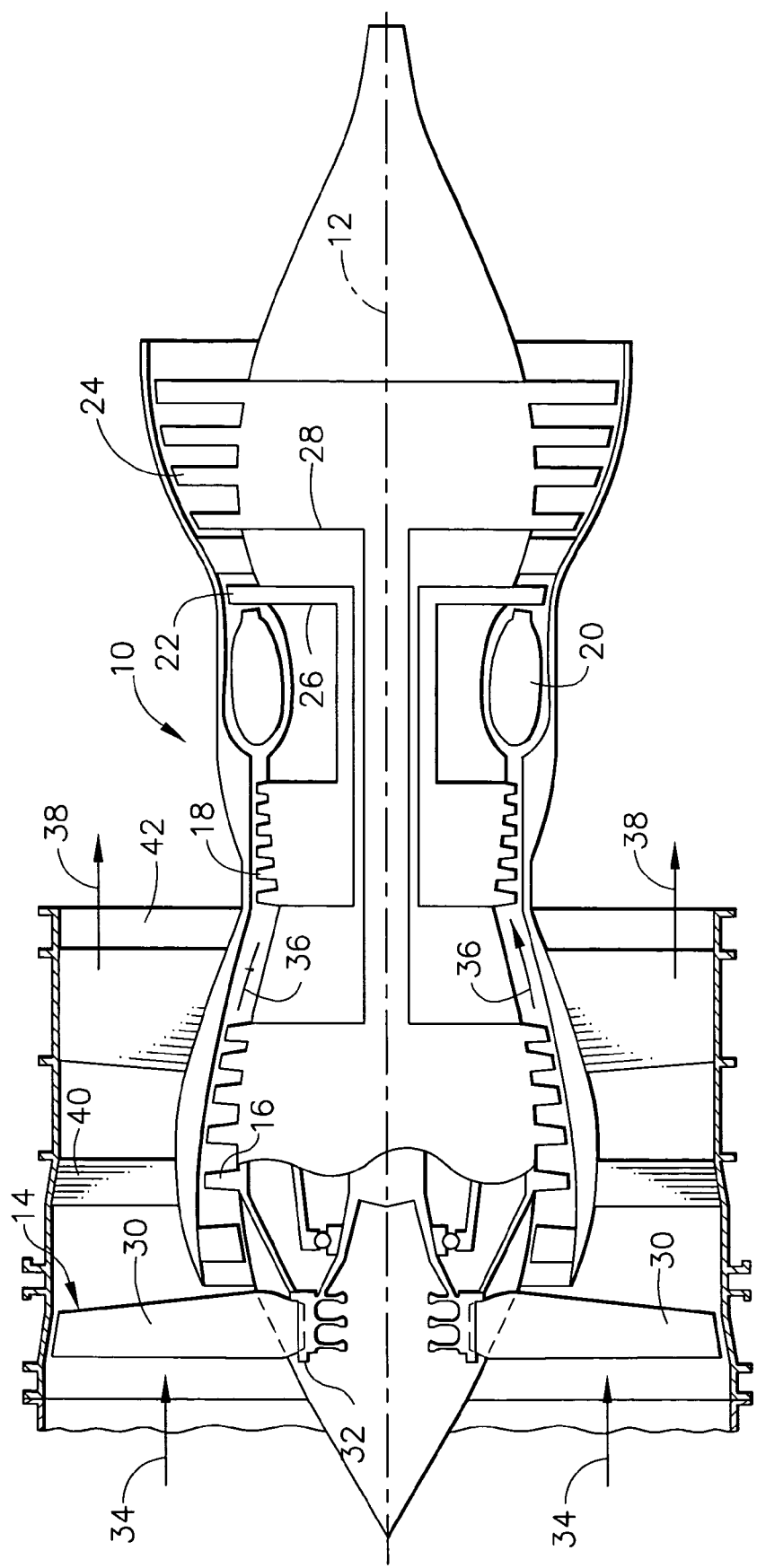
FIG. 1 is a schematic, longitudinal cross-sectional view of a gas turbine engine.

Referring to the drawings wherein identical reference numerals denote the same elements throughout the various views, FIG. 1 schematically shows an exemplary turbofan gas turbine engine 10. While turbofan engines in general are well known in the art, a brief description of the overall configuration of the engine 10 and the interrelationship of its various components will enhance understanding of the invention to be described below. Furthermore, it should be pointed out that a turbofan engine is used only as an example; the present invention is not limited to turbofan engines and can be implemented in a wide variety of engine types as well as other applications.

The engine 10 includes, in serial axial flow communication about a longitudinal centerline axis 12, a fan 14, booster 16, high pressure compressor 18, combustor 20, high pressure turbine 22, and low pressure turbine 24. The high pressure turbine 22 is drivingly connected to the high pressure compressor 18 with a first rotor shaft 26, and the low pressure turbine 24 is drivingly connected to both the booster 16 and the fan 14 with a second rotor shaft 28. The fan 14 comprises a plurality of radially extending fan blades 30 mounted on an annular disk 32, wherein the disk 32 and the blades 30 are rotatable about the longitudinal centerline axis 12 of engine 10.

During operation of engine 10, ambient air 34 enters the engine inlet and a first portion of the ambient air 34, denoted the primary gas stream 36, passes through the fan 14, booster 16 and high pressure compressor 18, being pressurized by each component in succession. The primary gas stream 36 then enters the combustor 20 where the pressurized air is mixed with fuel and burned to provide a high energy stream of hot combustion gases. The high energy gas stream passes through the high pressure turbine 22 where it is expanded, with energy extracted to drive the high pressure compressor 18, and then the low pressure turbine 24 where it is further expanded, with energy being extracted to drive the fan 14 and the booster 16. A second portion of the ambient air 34, denoted the secondary or bypass airflow 38, passes through the fan 14 and the fan outlet guide vanes 40 before exiting the engine through an annular duct 42, wherein the secondary airflow 38 provides a significant portion of the engine thrust.

Figure 2:
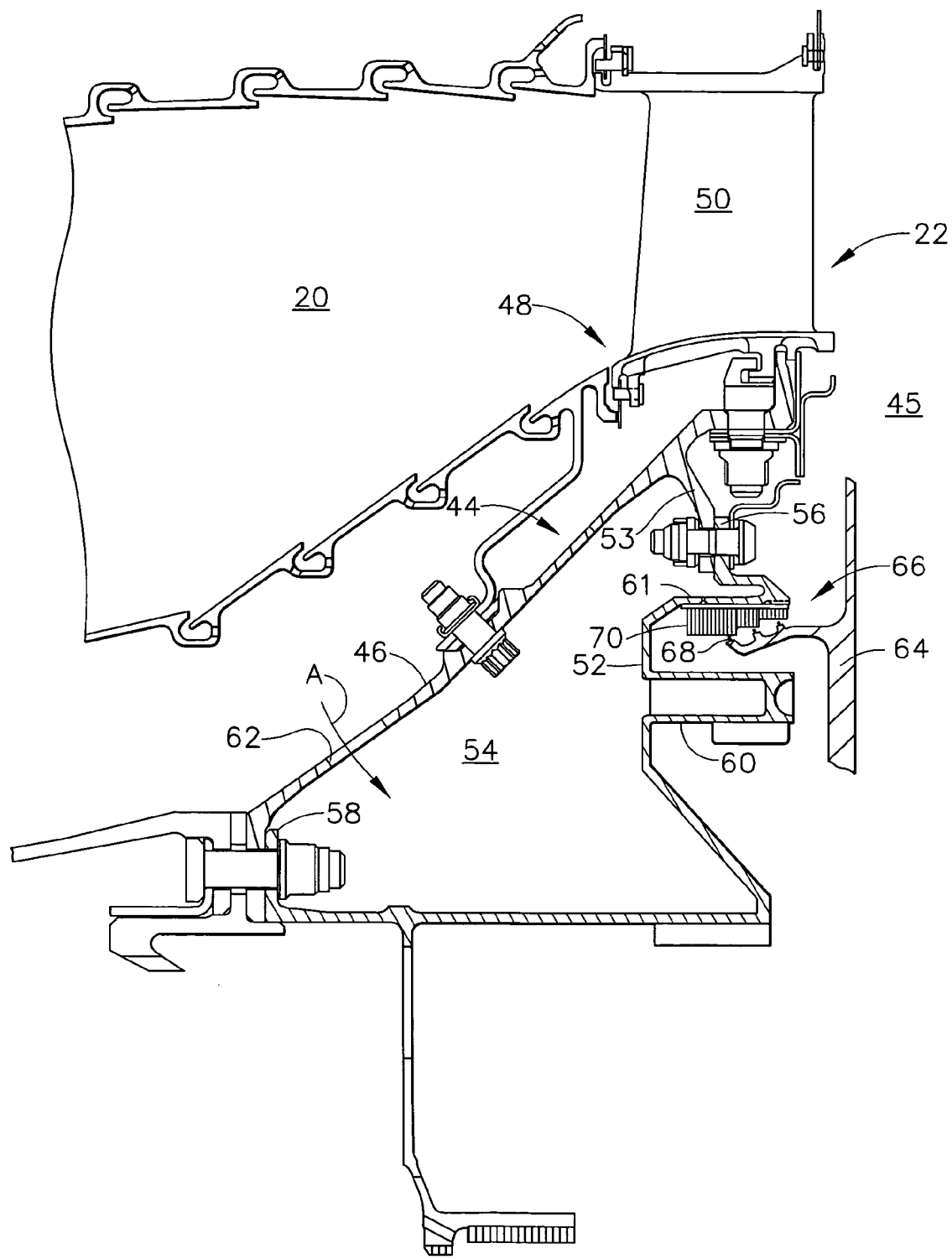
FIG. 2 is a partial cross-sectional view of the high pressure turbine section of the gas turbine engine of FIG. 1.

Referring to FIG. 2, there is shown a partial view of the high pressure turbine 22. The high pressure turbine 22 includes a turbine nozzle assembly 44 and a first stage turbine rotor (not shown in FIG. 2) located aft or downstream of the turbine nozzle assembly 44. The turbine nozzle assembly 44 and the turbine rotor are spaced axially to define a forward wheel cavity 45 therebetween (i.e., immediately forward of the turbine rotor). The forward wheel cavity 45 is in fluid communication with the turbine flow path through which the hot combustion gases flow.

The turbine nozzle assembly 44 includes an inner nozzle support 46 to which a plurality of circumferentially adjoining nozzle segments 48 is mounted. The nozzle segments 48 collectively form a complete 360º assembly. Each segment 48 has two or more circumferentially spaced vanes 50 (one shown in FIG. 2) over which the combustion gases flow. The vanes 50 are configured so as to optimally direct the combustion gases to the first stage turbine rotor. The inner nozzle support 46 is a stationary member suitably supported in the engine 10 and has a substantially conical configuration. The nozzle segments 48 are mounted to the axially and radially distal end of the inner nozzle support 46. The turbine nozzle assembly 44 also includes a stationary member 52 fastened to an inwardly extending flange 53 formed on the inner nozzle support 46, near the axially and radially distal end thereof. Although shown as a separate piece, the stationary member 52 could alternatively be integrally formed with the inner nozzle support 46. The inner nozzle support 46 and the stationary member 52 define a chamber 54 located axially therebetween.

The stationary member 52 is a generally annular structure having an outer flange 56, and inner flange 58 and an inducer 60 radially disposed between the outer flange 56 and the inner flange 58. The outer flange 56 is formed on a flange arm 61 that is annular in configuration and defines an axially extending, substantially cylindrical surface. As represented by arrow A in FIG. 2, cooling air (typically air diverted from the compressor 18) passes through a series of air holes 62 formed in the inner nozzle support 46 into the chamber 54. The inducer 60 accelerates and directs some of this air tangentially toward the turbine rotor located aft of the turbine nozzle assembly 44. The inducer 60 typically comprises a circumferentially disposed array of vanes that controls the tangential speed and direction of the airflow so that it is substantially equal to that of the turbine rotor.

The engine 10 further includes an annular rotating member 64 fixed for rotation with the turbine rotor. The rotating member 64 contacts the stationary member 52 to form a forward outer seal 66 for sealing compressor discharge air bled off for cooling purposes from the hot gases in the turbine flow path. Preferably, the forward outer seal 66 is a rotating labyrinth seal that includes a number of thin, tooth-like projections 68 attached to, or integrally formed on, the rotating member 64. The projections 68 are annular members that extend radially outward toward the flange arm 61. The labyrinth seal 66 further includes an annular stator element 70 attached to the flange arm 61 and positioned radially outward of and circumferentially about the projections 68.

Figure 3:
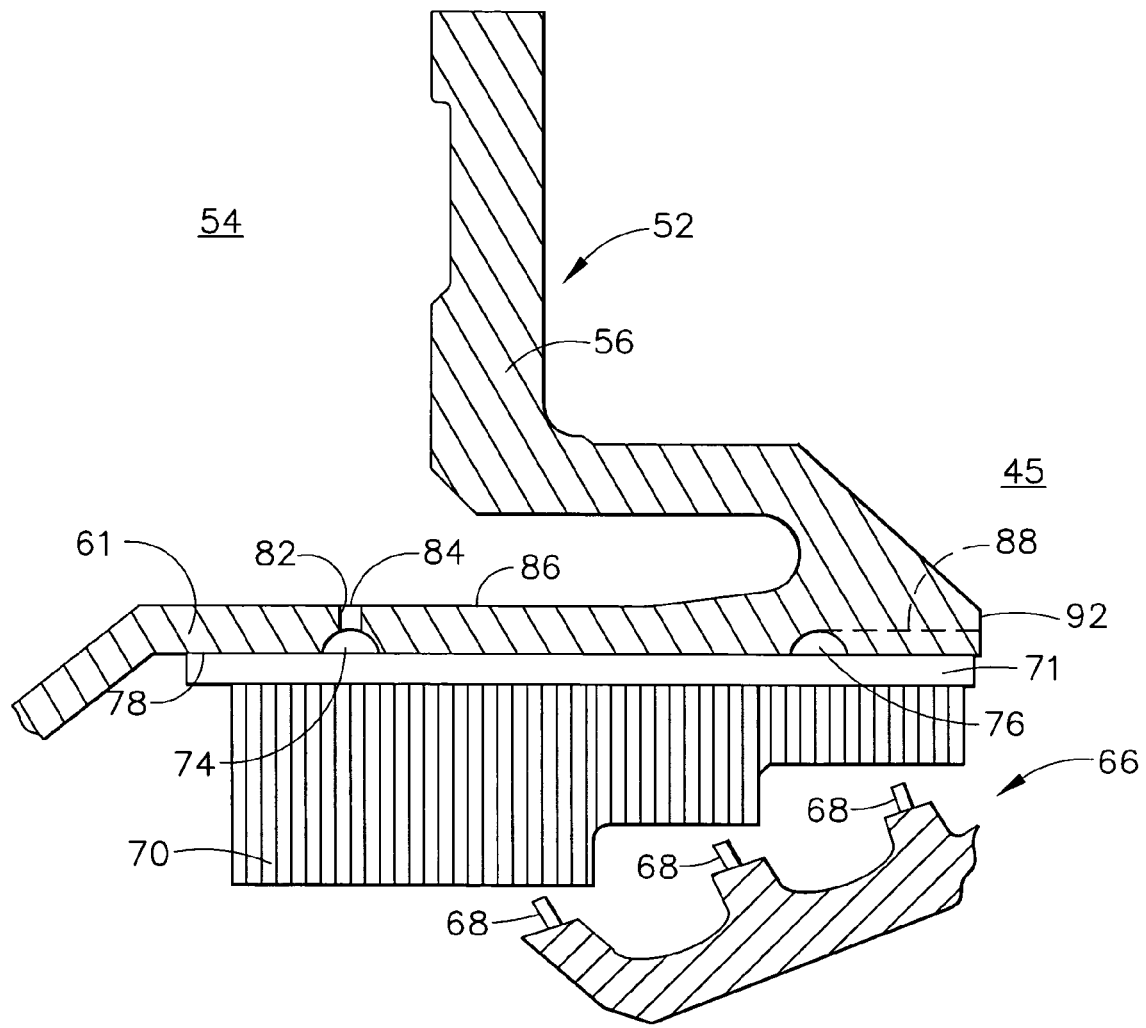
FIG. 3 is an enlarged, partial cross-sectional view (taken along line 3—3 of FIG. 4) showing the forward outer seal from the high pressure turbine section of FIG. 2 in more detail.

Turning now to FIG. 3, the radially outer surface of the stator element 70 is mounted to the flange arm 61 via an annular backing plate 71. The radially inner surface of the stator element 70 is tiered. Each one of the projections 68 is axially aligned with a corresponding tier of the stator element 70. By "axially aligned," it is meant that each projection 68 is located along the axial direction between the forward and aft edges of the corresponding tier. The outer circumference of each projection 68 rotates within a small tolerance of the corresponding inner circumference of the stator element 70, thereby effecting sealing between the cooling air and the hot gases in the turbine flow path. The stator element 70 is preferably made of a honeycomb material to reduce friction and subsequent heat generation during operation. Although FIG. 2 shows three of the projections 68, it should be noted that the present invention is not limited to three; more or fewer than three projections can be used.

Figure 4:
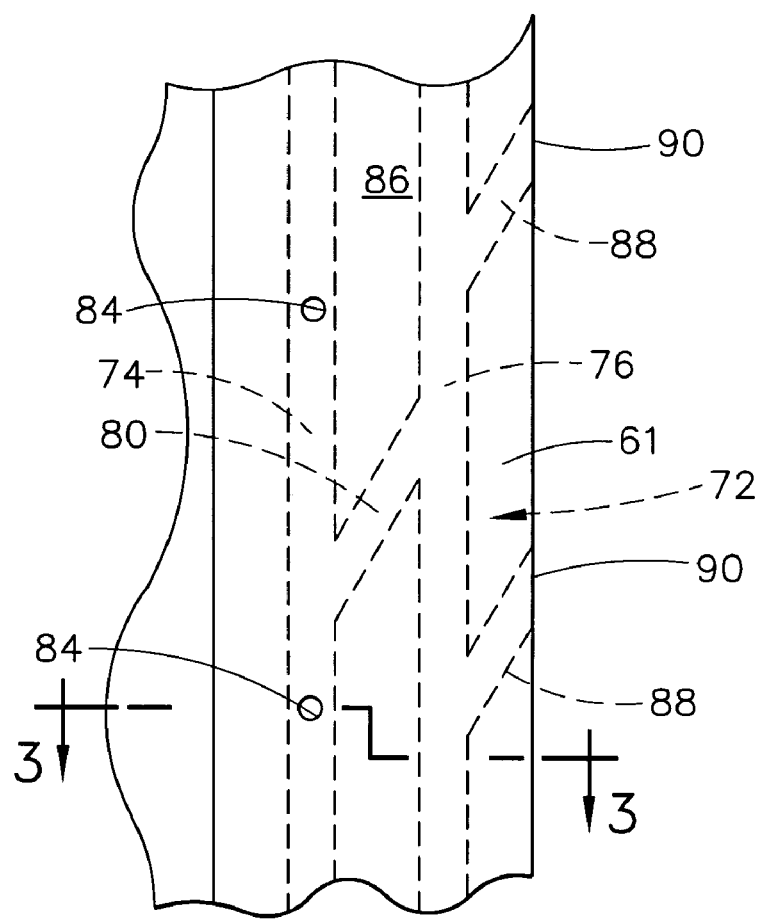
FIG. 4 is a partial, radial plan view of the radially outer surface of the flange arm from the forward outer seal of FIG. 3.
Figure 5:
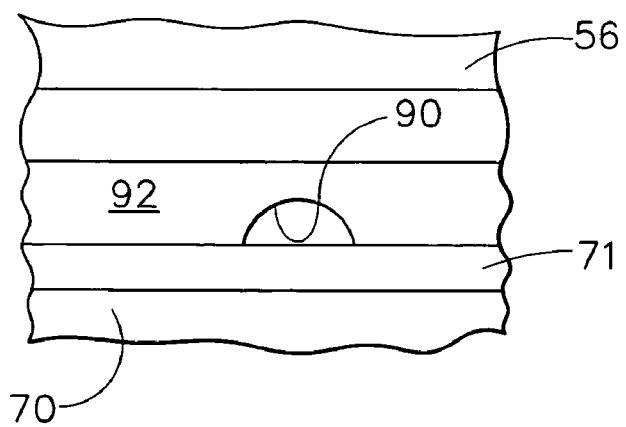
FIG. 5 is a partial, aft-looking-forward end view of the flange arm from the forward outer seal of FIG. 3.

Referring to FIGS. 3–5 a bypass circuit 72 is illustrated. The bypass circuit 72 provides for the flow of air from the chamber 54 to the forward wheel cavity 45, thereby providing faster heating of the flange arm 61 and the outer flange 56 and reducing the thermal gradient thereof. The airflow through the bypass circuit 72 also purges the forward wheel cavity 45 so as to prevent hot gas ingestion. In the illustrated embodiment, the bypass circuit 72 comprises first and second channels 74 and 76 formed in the radially inner surface 78 of the flange arm 61, which is the surface to which the backing plate 71 is mounted. Both of the first and second channels 74 and 76 extend around the entire circumference of the flange arm 61 to define continuous ring channels. The channels 74 and 76 are spaced axially with the first channel 74 being located near the forward end of the flange arm 61, and the second channel 76 being located near the aft end of the flange arm 61. The bypass circuit 72 further includes a plurality of connecting slots 80 formed in the radially inner surface 78 and equally spaced about the circumference of the flange arm 61. The connecting slots 80 extend axially between the first and second channels 74 and 76 to allow air to flow from the first channel 74 to the second channel 76.

The bypass circuit 72 further includes a plurality of inlet passages 82 equally spaced about the circumference of the flange arm 61. Each inlet passage 82 extends radially through the flange arm 61 from an inlet port 84 formed on the radially outer surface 86 of the flange arm 61 to the first channel 74. The inlet passages 82 thus provide fluid communication between the chamber 54 and the first channel 74. The inlet passages could alternatively have a non-radial orientation as long as they provided fluid communication between the chamber 54 and the first channel 74. The number and size of the inlet passages 82 are selected to provide a significant contribution to control the desired amount of airflow through the bypass circuit 72. A plurality of outlet slots 88 is formed in the radially inner surface 78 and equally spaced about the circumference of the flange arm 61. Each outlet slot 88 extends axially from the second channel 76 to the aft end of the flange arm 61 to define an outlet port 90 in the aft facing edge 92 of the flange arm 61. The outlet slots 88 are thus in fluid communication with the first channel 74 via the second channel 76 and the connecting slots 80. Although they can be substantially parallel to the centerline axis 12, the outlet slots 88, as well as the connecting slots 80, are preferably angled in a circumferential direction to minimize flow-turning losses and pre-swirl the cavity purge air to reduce cavity windage and absolute air temperature.

It should be noted that the present invention is not limited to two ring channels. Additional ring channels, and corresponding additional sets of connecting slots, could be utilized. Furthermore, the bypass circuit could be configured with a single ring channel. In this case, a plurality of inlet passages would be formed in the flange arm in fluid communication with the single ring channel. A plurality of outlet slots would be formed in the flange arm so as to extend from the single ring channel to the aft end of the flange arm. Connecting slots would not be required in this embodiment.

The configuration of the bypass circuit simplifies machining relative to conventional bypass circuits. Specifically, the two circumferential channels 74 and 76 can be turned on a lathe, and the angled connecting slots 80 and outlet slots 88 can be milled with a ball mill. This provides a large fillet radius that minimizes stress concentrations in the flange arm 61. Generally, the connecting slots 80 and outlet slots 88 define fillet radii that are greater than the slot depth. In one embodiment, slot fillet radii are approximately 3–4 times greater than the slot depth. After the bypass circuit 72 is machined, the backing plate 71 is mounted to the radially inner surface 78 so as to cover the first and second channels 74 and 76, the connecting slots 80 and the outlet slots 88.

During engine operation, air from the chamber 54 enters the bypass circuit 72 via the inlet ports 84. The air passes through the inlet passages 82 to the first channel 74. Air then passes from the first channel 74 to the second channel 76 via the connecting slots 80. From the second channel 76, the air flows through the outlet slots 88 and exits the bypass circuit 72 through the outlet ports 90 into the forward wheel cavity 45. The geometry of the bypass circuit 72 provides a more uniform distribution of the relatively hot air to heat the flange arm 61 and the outer flange 56 evenly.

Figure 6:
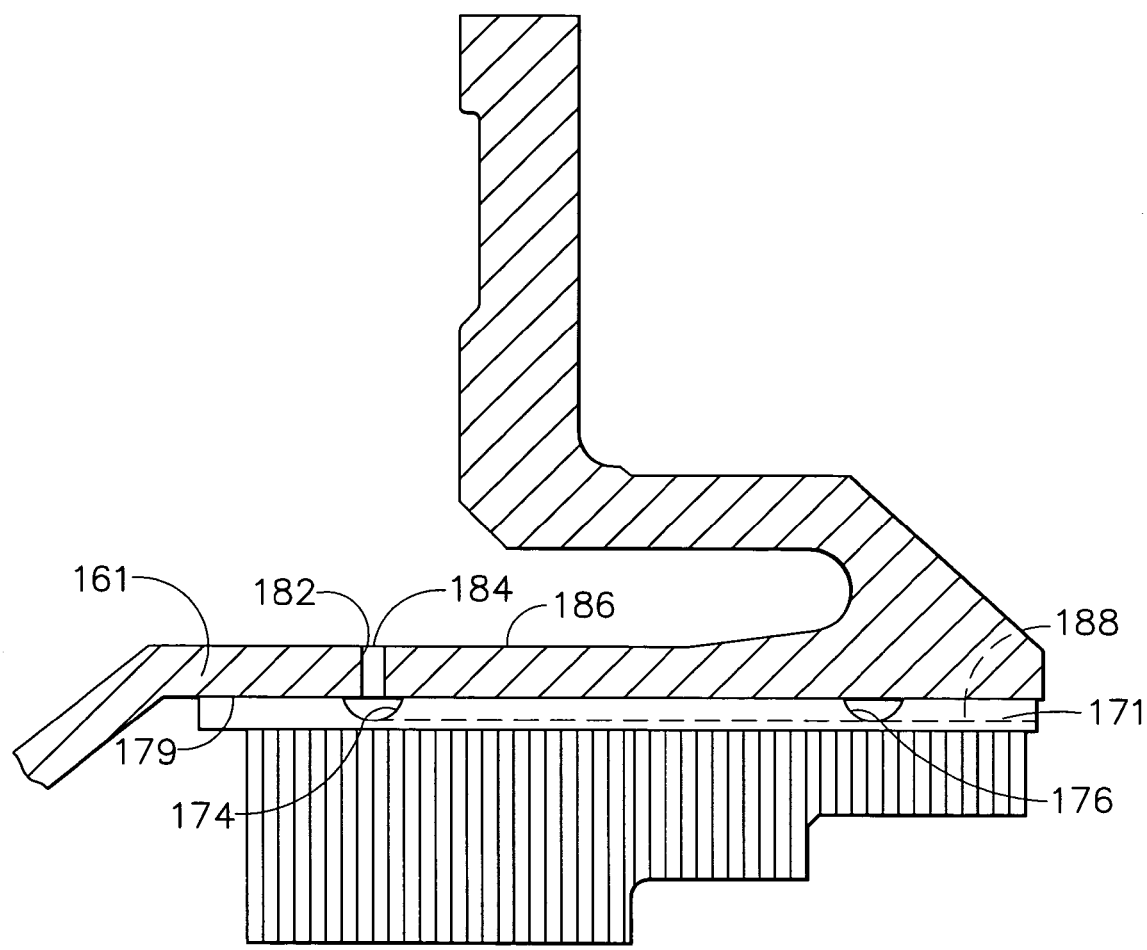
FIG. 6 is an enlarged, partial cross-sectional view (taken along line 6—6 of FIG. 7) showing a second embodiment of a forward outer seal for a high pressure turbine section.
Figure 7:
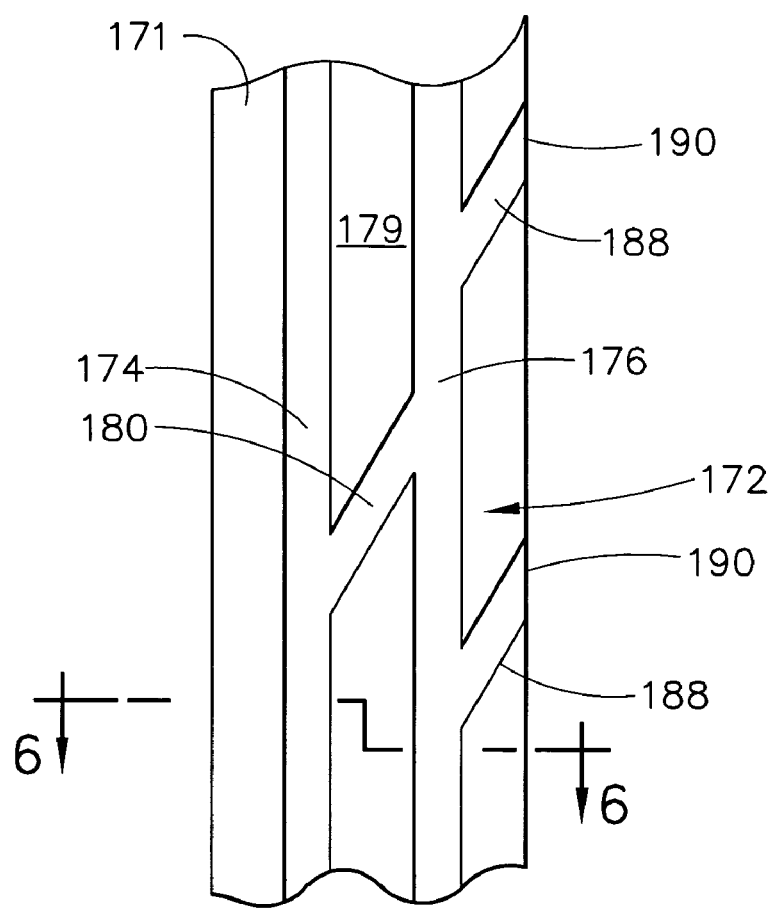
FIG. 7 is a partial, radial plan view of the radially outer surface of the backing plate from the forward outer seal of FIG. 6.
Figure 8:
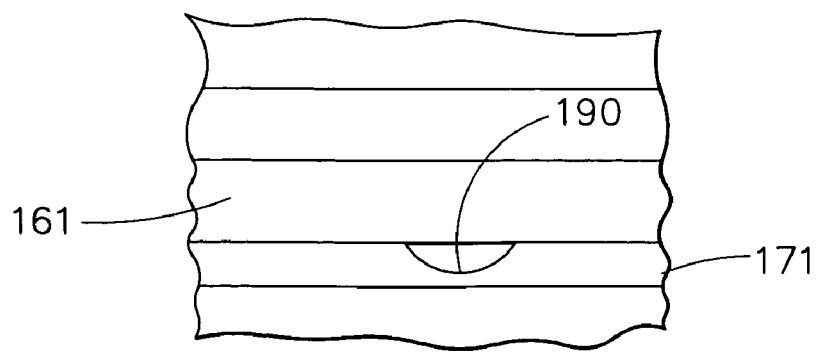
FIG. 8 is a partial, aft-looking-forward end view of the backing plate from the forward outer seal of FIG. 6.

Referring to FIGS. 6–8, an alternative embodiment of a bypass circuit 172 is illustrated. In the this embodiment, the bypass circuit 172 comprises first and second channels 174 and 176 formed in the radially outer surface 179 of the backing plate 171, which is the surface that is mounted to the flange arm 161. Both of the first and second channels 174 and 176 extend around the entire circumference of the backing plate 171 to define continuous ring channels. The channels 174 and 176 are spaced axially with the first channel 174 being located near the forward end of the backing plate 171, and the second channel 176 being located near the aft end of the backing plate 171. The bypass circuit 172 further includes a plurality of connecting slots 180 formed in the radially outer surface 179 and equally spaced about the circumference of the backing plate 171. The connecting slots 180 extend axially between the first and second channels 174 and 176 to allow air to flow from the first channel 174 to the second channel 176.

The bypass circuit 172 further includes a plurality of inlet passages 182 equally spaced about the circumference of the flange arm 161. Each inlet passage 182 extends radially through the flange arm 161 from an inlet port 184 formed on the radially outer surface 186 of the flange arm 161 to the first channel 174. A plurality of outlet slots 188 is formed in the radially outer surface 179 and equally spaced about the circumference of the backing plate 171. Each outlet slot 188 extends axially from the second channel 176 to the aft end of the backing plate 171 to define an outlet port 190 in the aft facing edge of the backing plate 171. The outlet slots 188 are thus in fluid communication with the first channel 174 via the second channel 176 and the connecting slots 180. As with the first embodiment, it should be noted that this embodiment is not limited to two ring channels. Additional ring channels, and corresponding additional sets of connecting slots, could be utilized. Furthermore, the bypass circuit could be configured with just a single ring channel.

While specific embodiments of the present invention have been described, it will be apparent to those skilled in the art that various modifications thereto can be made without departing from the spirit and scope of the invention as defined in the appended claims.

What is claimed is:

1. A gas turbine engine component comprising:
an annular flange arm having a radially inner surface;
a first channel formed in said radially inner surface;
at least one inlet passage extending through said flange arm in fluid communication with said first channel; and
at least one outlet slot formed in said radially inner surface in fluid communication with said first channel.

2. The component of claim 1 further comprising:
a second channel formed in said radially inner surface, said second channel being spaced axially from said first channel; and
at least one connecting slot formed in said radially inner surface and extending between said first and second channels, wherein said outlet slot extends axially from said second channel.

3. The component of claim 2 wherein said first and second channels circumferentially extend entirely around said flange arm.

4. The component of claim 2 wherein said first channel is located forward of said second channel.

5. The component of claim 2 wherein said connecting slot and said outlet slot are angled in a circumferential direction.

6. The component of claim 2 wherein said connecting slot and said outlet slot each define a depth and a fillet radius that is greater than said depth.

7. A gas turbine engine component comprising:
an annular flange arm having a radially inner surface, a radially outer surface, a forward end and an aft end defining an aft edge;
a first channel formed in said radially inner surface;
a second channel formed in said radially inner surface, said second channel being spaced axially from said first channel;
a plurality of connecting slots formed in said radially inner surface, each one of said connecting slots extending axially between said first and second channels;
a plurality of inlet passages extending through said flange arm from said radially outer surface to said first channel; and
a plurality of outlet slots formed in said radially inner surface, each one of said outlet slots extending axially from said second channel to said aft edge.

8. The component of claim 7 wherein said first and second channels circumferentially extend entirely around said flange arm.

9. The component of claim 7 wherein said first channel is located near said forward end and said second channel is located near said aft end.

10. The component of claim 7 wherein each one of said outlet slots defines an outlet port in said aft edge.

11. The component of claim 7 wherein said connecting slots and said outlet slots are angled in a circumferential direction.

12. The component of claim 7 wherein each one of said connecting slots and each one of said outlet slots define a depth and a fillet radius that is greater than said depth.

13. The component of claim 7 wherein said connecting slots are equally spaced about said flange arm.

14. The component of claim 7 wherein said inlet passages are equally spaced about said flange arm.

15. The component of claim 7 wherein said outlet slots are equally spaced about said flange arm.

* * * * *